_UNITED STATES PATENT OFFICE._

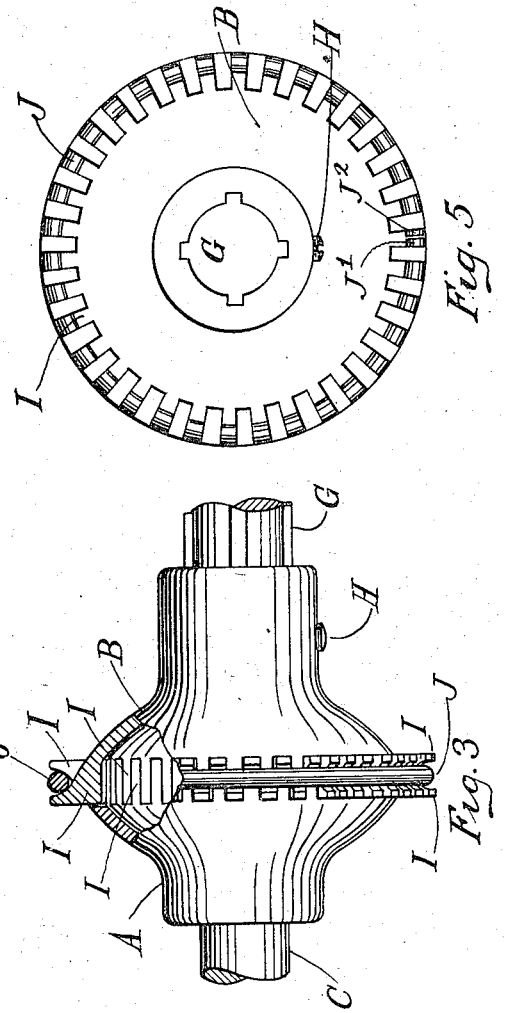

STEPHEN JENCICK, OF MINNEAPOLIS, MINNESOTA, ASSIGNOR TO G. A. SCHANZE, OF MINNEAPOLIS, MINNESOTA.

COUPLING DEVICE.

1,263,252.

Specification of Letters Patent. Patented Apr. 16, 1918.

Application filed January 8, 1915. Serial No. 1,159.

*To all whom it may concern:*

Be it known that I, STEPHEN JENCICK, a citizen of the State of Austria, residing at Minneapolis, in the county of Hennepin and State of Minnesota, have invented certain new and useful Improvements in Coupling Devices, of which the following is a specification.

My invention relates to couplings and especially to couplings used to attach magnetos and machines requiring similar adjustment to rotating drive shafts, and has for its objects: first, to provide a coupling which may be easily and accurately timed and adjusted, second, to provide a large bearing and wearing surface, and third, to provide a coupling which will permit of a slight universal motion.

In the accompanying drawing: Figures 1 and 2 are vertical sections of the principal and engaging parts of the coupling with the spring wire removed; Fig. 3 is a front view of the coupling completely mounted and in engagement; Figs. 4 and 5 are end views of the coupling as shown in Fig. 3.

Like parts are indicated by the same letters in all the figures.

A and B are the two engaging parts of the coupling. A is fixedly mounted on magneto shaft C by means of key D, lock washer E and nut F, B is mounted upon drive shaft G and is adjustable longitudinally thereon. Set screw H provides a means for fixing the position of the engaging part of coupling B upon shaft G when desired. A and B are provided with the same number of similar teeth I which engage and interlock alternately when the coupling is assembled as shown in Fig. 3. The side faces of these teeth are disposed in longitudinal planes radial to and passing through the central axis, as a consequence of which, under driving conditions, the teeth of one member bear over their side faces against the side faces of the teeth of the other member and do not localize the contact at points or along lines. Spring wire J is bent in circular shape to fasten and clamp securely about the teeth I of engaging parts A and B so that when assembled the two ends of J, J¹ and J² almost butt as shown in Fig. 5. Teeth I are constructed with sufficient space between them when interlocked and assembled to allow a slight universal motion at the coupling.

To render my invention clearer it may be noticed that in a coupling of convenient size a great number of engaging teeth may be used thereby giving great strength, large bearing surface, and long wearing qualities. The greater the number of teeth employed the more accurate an adjustment can be made in timing a magneto or other device requiring similar adjustment. The adjustment may be quickly and easily changed by removing the spring wire or loosening the set screw and changing the relative position of the two engaging parts of the coupling. My invention provides for and allows a slight universal motion at the coupling. Another feature of great value is that in alining the drive and magneto shafts one can tell at a glance by the relative position and space between the teeth of the respective engaging parts of the coupling whether or not an accurate alinement is made.

Either the spring or the set screw could be omitted as the other would provide sufficient means for holding the coupling in engagement.

I claim:

1. In a coupling device, the combination of two circular engaging parts provided at the circumference with the same number of teeth which engage and interlock, one of said engaging parts being fixedly mounted on one end of one of the shafts to be coupled and the other engaging part being adjustable longitudinally on the other shaft to be coupled, and a set screw to fix the position of said movable engaging part.

2. In a coupling device, the combination of two circular engaging parts provided at the circumference with the same number of teeth which engage and interlock, one of said engaging parts being fixedly mounted on one end of one of the shafts to be coupled and the other engaging part being mounted on the other shaft to be coupled, the teeth of the engaging parts being so formed that when in engagement a groove is formed between the teeth of the respective engaging parts, and a spring wire formed to clamp about said coupling in said groove.

3. In a coupling device, the combination of two circular engaging parts provided at the circumference with the same number of teeth which engage and interlock, one of said engaging parts being fixedly mounted on one of the shafts to be coupled and the other engaging part being adjustable longitudinally on the other shaft to be coupled, a set screw to fix the position of said adjustable engaging part on its shaft, the teeth of the engaging parts being so formed that when in engagement a groove is formed between the teeth of the respective engaging parts, and a spring wire surrounding said coupling and lying in said groove.

STEPHEN JENCICK.

Witnesses:
MONA J. KAYE,
SARAH S. DUDLEY.